United States Patent
Srikantan et al.

(10) Patent No.: US 7,051,337 B2
(45) Date of Patent: May 23, 2006

(54) METHOD AND APPARATUS FOR POLLING MULTIPLE SOCKETS WITH A SINGLE THREAD AND HANDLING EVENTS RECEIVED AT THE SOCKETS WITH A POOL OF THREADS

(75) Inventors: Geetha Srikantan, Palo Alto, CA (US); Aravind Narasimhan, New York, NY (US); Seth Proctor, Concord, MA (US); Jan Brittenson, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 956 days.

(21) Appl. No.: 09/828,052

(22) Filed: Apr. 6, 2001

(65) Prior Publication Data

US 2001/0029548 A1    Oct. 11, 2001

Related U.S. Application Data (60) Provisional application No. 60/195,756, filed on Apr. 8, 2000.

(51) Int. Cl.
G06F 9/46     (2006.01)

(52) U.S. Cl. ............... 719/318; 709/231; 709/227

(58) Field of Classification Search ........ 709/200–207, 709/217–231, 238–244; 719/318, 310–317, 719/332, 328; 718/100–103, 106–108; 340/3.51; 370/345; 379/92.01; 710/44–48; 725/16

See application file for complete search history.

(56) References Cited

U.S. PATENT DOCUMENTS

| | | | |
|---|---|---|---|
| 5,442,749 A | | 8/1995 | Northcutt et al. |
| 5,535,878 A | * | 7/1996 | Reed .......................... 206/6.1 |
| 5,737,531 A | | 4/1998 | Ehley |
| 5,751,280 A | | 5/1998 | Abbott et al. |
| 5,778,182 A | * | 7/1998 | Cathey et al. .............. 709/219 |

(Continued)

FOREIGN PATENT DOCUMENTS

EP     0-817-489 A2     1/1998

(Continued)

OTHER PUBLICATIONS

"JT Router: Let your clients tunnel their way across the internet", Oct. 1, 1997, pp. 1-12, Ajit Sagar, SYS-CON.*

(Continued)

*Primary Examiner*—John Follansbee
*Assistant Examiner*—Haresh Patel
(74) *Attorney, Agent, or Firm*—Park, Vaughan & Fleming LLP (57) ABSTRACT

A method and apparatus are provided for handling events received at a media streaming server. Server sockets configured to receive events are divided into collections and registered with a polling object. Each collection shares a processor thread for detecting events. Each socket is associated with an event consumer object that is notified when an event is received at the socket. The event consumer objects invoke task objects to handle the events. Task objects are queued in a task queue and execute using a pool of processor threads. Event consumer objects are derived from an abstract base consumer class that defines a common interface. Subclasses of the base consumer class are configured for different types of events that may be received (e.g., connection requests, media streaming commands, media data, media stream quality reports). Specific event consumer objects are instantiated from the subclasses to provide implementations of the common interface.

13 Claims, 6 Drawing Sheets

U.S. PATENT DOCUMENTS

| | | | |
|---|---|---|---|
| 6,385,644 B1* | 5/2002 | Devine et al. | 709/206 |
| 6,421,711 B1* | 7/2002 | Blumenau et al. | 709/213 |
| 6,463,454 B1* | 10/2002 | Lumelsky et al. | 718/105 |
| 6,513,152 B1* | 1/2003 | Branson et al. | 717/100 |
| 6,584,093 B1* | 6/2003 | Salama et al. | 370/351 |
| 6,615,258 B1* | 9/2003 | Barry et al. | 709/223 |
| 6,735,634 B1* | 5/2004 | Geagan et al. | 709/235 |
| 6,763,392 B1* | 7/2004 | del Val et al. | 709/231 |
| 6,771,644 B1* | 8/2004 | Brassil et al. | 370/390 |
| 6,778,653 B1* | 8/2004 | Kallas et al. | 379/201.02 |
| 6,801,604 B1* | 10/2004 | Maes et al. | 379/88.17 |
| 6,871,213 B1* | 3/2005 | Graham et al. | 709/205 |
| 2001/0052008 A1* | 12/2001 | Jacobus | 709/223 |
| 2002/0112076 A1* | 8/2002 | Rueda et al. | 709/245 |
| 2002/0120716 A1* | 8/2002 | Raghunathan et al. | 709/219 |
| 2003/0131353 A1* | 7/2003 | Blom et al. | 725/25 |

FOREIGN PATENT DOCUMENTS

EP     0-901-249 A2     3/1999

OTHER PUBLICATIONS

IBM Technical Disclosure Bulletin, "Structured Metadata for Application Specific Viewers for Streamed Internet Video/Audio". XP-000739449 2vol. 40, No. 10, Oct. 1997. pp. 123-127.

* cited by examiner

METHOD AND APPARATUS FOR POLLING MULTIPLE SOCKETS WITH A SINGLE THREAD AND HANDLING EVENTS RECEIVED AT THE SOCKETS WITH A POOL OF THREADS

RELATED APPLICATIONS

This application claims priority to U.S. Provisional Application No. 60/195,756, which was filed Apr. 8, 2000 and is incorporated herein by reference. The present application is related to U.S. Pat. No. 6,857,130, which was filed Apr. 6, 2001, issued Feb. 15, 2005 and is entitled "Resynchronizing Media During Streaming," and is also related to U.S. patent application Ser. No. 09/827,866, which was filed Apr. 6, 2001 and is entitled "Streaming a Single Media Track to Multiple Clients."

BACKGROUND

This invention relates to the field of computer systems. More particularly, an apparatus and methods are provided for handling events received at a server socket that may be shared among multiple client connections.

A computer system creates and uses sockets to handle communications with other computer systems. Some systems, such as servers, are configured to establish a large number of sockets because of the number of other computer systems (e.g., clients) with which it must communicate. A computer server may even set up and dedicate multiple sockets for each client system that it communicates with, because each socket may be configured with limited functionality, such as to handle only one type of connection, handle only one communication protocol, dispatch only one type of task, etc.

For example, in a server configured to stream QuickTime media to clients, one server socket may be allocated to each client media stream to handle control functions (e.g., using RTSP (Real-Time Streaming Protocol)), another socket for transmitting the media to the client (e.g., according to RTP (Real-Time Transport Protocol)), and yet another to receive status information from the client (e.g., through RTCP (Real-Time Transport Control Protocol)).

However, such systems have limited scalability, because as the number of clients grows, the number of sockets that the server must maintain grows commensurately. And, because each socket is typically allocated its own share of processor resources (e.g., in the form of a dedicated thread), the resulting contention for processor time places an upper bound on the number of sockets or clients that the server can service. Because of the large number of processes, threads, daemons or other entities demanding processor time on behalf of individual sockets or media streams, the server spends an inordinate amount of time performing context switches. And other, non-media tasks, may be denied necessary resources.

Other systems attempt to avoid this contention and lack of scalability by allocating one processor thread or period of processor time among all sockets handling client communications, or among all sockets handling a particular type or form of client communication. However, as the number of media streams and sockets grows, there is the danger that insufficient resources will be allotted to a given socket or stream (particularly a real-time media stream).

SUMMARY

Therefore, in one embodiment of the invention, an apparatus and methods are provided for sharing a server's processing capability (e.g., in the form of execution threads) among multiple sockets through which the server communicates with clients or other computer systems. The server may be configured to stream media, serve data or provide other services to the clients. And, multiple client connections may be established or managed through a single shared socket.

In this embodiment, server sockets may be apportioned into multiple collections, with each collection being allocated one or more threads. When an event (e.g., a connection request, a media streaming command, a data packet, a data request) is received at a socket, a thread passes the event to a registered consumer of the socket. Consumers are configured to handle events by issuing or performing the necessary tasks. When, for example, an event is received at a socket shared among multiple communication connections, a responsible consumer may identify the type of event received, identify the client or other entity that initiated the event, etc.

In one embodiment, specific socket consumers are derived from an abstract base class providing a basic interface for handling events, and may be supplemented with functionality necessary for handling particular types of events (e.g., new client connections, client requests for media streams, status information regarding a media stream). Thus, appropriate consumer objects may be instantiated for each new socket, and may register themselves and their sockets with a polling mechanism that monitors the various sockets to detect new events.

In another embodiment of the invention, a method is provided for handling events (e.g., client connections, streamed media, media streaming commands) received at sockets within a computer server. In this method, one or more sockets are registered with a polling module that polls the sockets in order to detect events. Each registered socket is associated with an event consumer responsible for events received at the socket. When an event is received at a registered socket, the associated event consumer is notified and issues tasks, as necessary, to facilitate handling of the event. In this embodiment of the invention, registered sockets may be divided into multiple collections. Within each collection, one processor thread is shared among the sockets for detecting events and notifying event consumers. Also, a pool of threads is allocated for executing tasks issued by the various event consumers.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a computer server configured to provide data or media streaming services to computers or communications devices of virtually any configuration (e.g., wired, wireless, portable, desktop). Details of such computers and other devices (e.g., processor, memory, data storage and display) are well known and may be omitted for the sake of clarity. Further, embodiments of the invention are described as they may be implemented in an object-oriented programming environment. Suitable variations of embodiments may be implemented using other programming models or frameworks, as will be appreciated by one skilled in the art.

It should also be understood that the techniques of the present invention might be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a storage medium such as a carrier wave, disk drive, or computer-readable medium. Exemplary forms of carrier waves may take the form of electrical, electromagnetic or optical signals conveying digital data streams along a local network or a publicly accessible network such as the Internet.

In one embodiment of the invention a media or data streaming server is configured to stream media to one or more clients. The server creates and maintains sockets with which to communicate with the clients. The sockets may be divided into multiple collections, with suitable processor resources being allocated to the collections. A given socket may be configured for use with multiple streams, multiple clients or client connections, multiple types of events, etc.

When an event is received at a server socket, a socket consumer—a program module or object that registered an interest in the socket—is notified. Different types of consumers may be generated for different types of events, such as a Listener consumer to handle new client connection requests, a Connection consumer to handle media streaming commands, a Receiver consumer to receive status information or, in a reflection mode of media streaming, to receive media streamed to the server from another media server, etc.

Illustratively, an incoming event at a socket is quickly passed to the appropriate consumer, so that the thread dedicated to receiving events at the socket can return its attention to its collection of sockets. This allows a limited number of threads to serve a large number of sockets without losing or delaying events. The socket consumer that receives the event may spawn one or more appropriate tasks to handle the event. The tasks may be issued as separate task objects and may share a pool of threads allocated to the execution of tasks.

Because threads are shared and are allotted in a controlled fashion, this embodiment of the invention can be readily scaled for different numbers of clients or other entities submitting events to the server.

Specific embodiments of the invention are described below as they may be implemented for streaming Quick-Time media from a UNIX-based computer system, such as a system executing the Solaris™ operating system by Sun Microsystems, Inc. Such embodiments may be modified for use with other types of media and other computer systems, as may be understood from the following detailed description.

An Illustrative Media Streaming Server

Media streaming allows a user to receive and enjoy media content without having to wait until the full program or presentation is downloaded to his or her client device. For example, the user can enjoy a pre-recorded program, or experience a live event in real-time, without waiting until the full program is received.

Media may be streamed in unicast or multicast mode. In unicast mode the streaming server maintains a dedicated session with each receiving client device, which grants a user great control over his or her stream. He or she may, for example, be able to pause a stream, rewind or fast-forward through the streamed media, or perform other control functions. However, this can lead to inefficient use of bandwidth for a large number of users. In multicast mode, the media streaming server streams a program to multiple users simultaneously, thereby using less bandwidth. This type of streaming is thus comparable to a traditional broadcast, and users have little control over their individual streams. Live events may normally be streamed in multicast mode, because it is more efficient for serving large numbers of users. And, because it is a live event being enjoyed in real-time, there is little need to manipulate the streamed media.

A media streaming server according to a present embodiment of the invention may operate in a "reflection" mode of operation, in which the server receives a media stream from another streaming system or server (usually in multicast mode), and forwards the media to one or more users (in unicast or multicast mode).

Streaming real-time media places constraints upon the issuing server, because delivery of each frame or other unit of the media must be performed in a specified order and within a certain period of time. Thus, despite the number of clients it serves, a media streaming server must strive to meet the demands of streaming real-time media so that the quality of service to the users does not drop to an unacceptable level. For example, regardless of the type of program (i.e., live or pre-recorded) and mode of streaming (i.e., unicast or multicast), streamed media is generally compressed to decrease the bandwidth that it consumes in transit, thus helping to ensure timely delivery of media to a client.

A media streaming server according to one embodiment of the invention is configured to stream QuickTime media and/or other forms of media, in a unicast or multicast mode, over a proprietary or publicly accessible network such as the Internet. Media streams are formatted according to a set of protocols compatible with the transmission medium. In particular, when streaming QuickTime media the server may be configured for RTSP (Real-Time Streaming Protocol) to facilitate a client's control of a media stream, RTP (Real- Time Transport Protocol) to deliver the stream to the client and/or receive media from another source, RTCP (Real-Time Transport Control Protocol) to receive or exchange information regarding the quality of a stream, SDP (Session Description Protocol) to describe media to the client, etc. Other embodiments may be configured for other media protocols.

Figure 1:
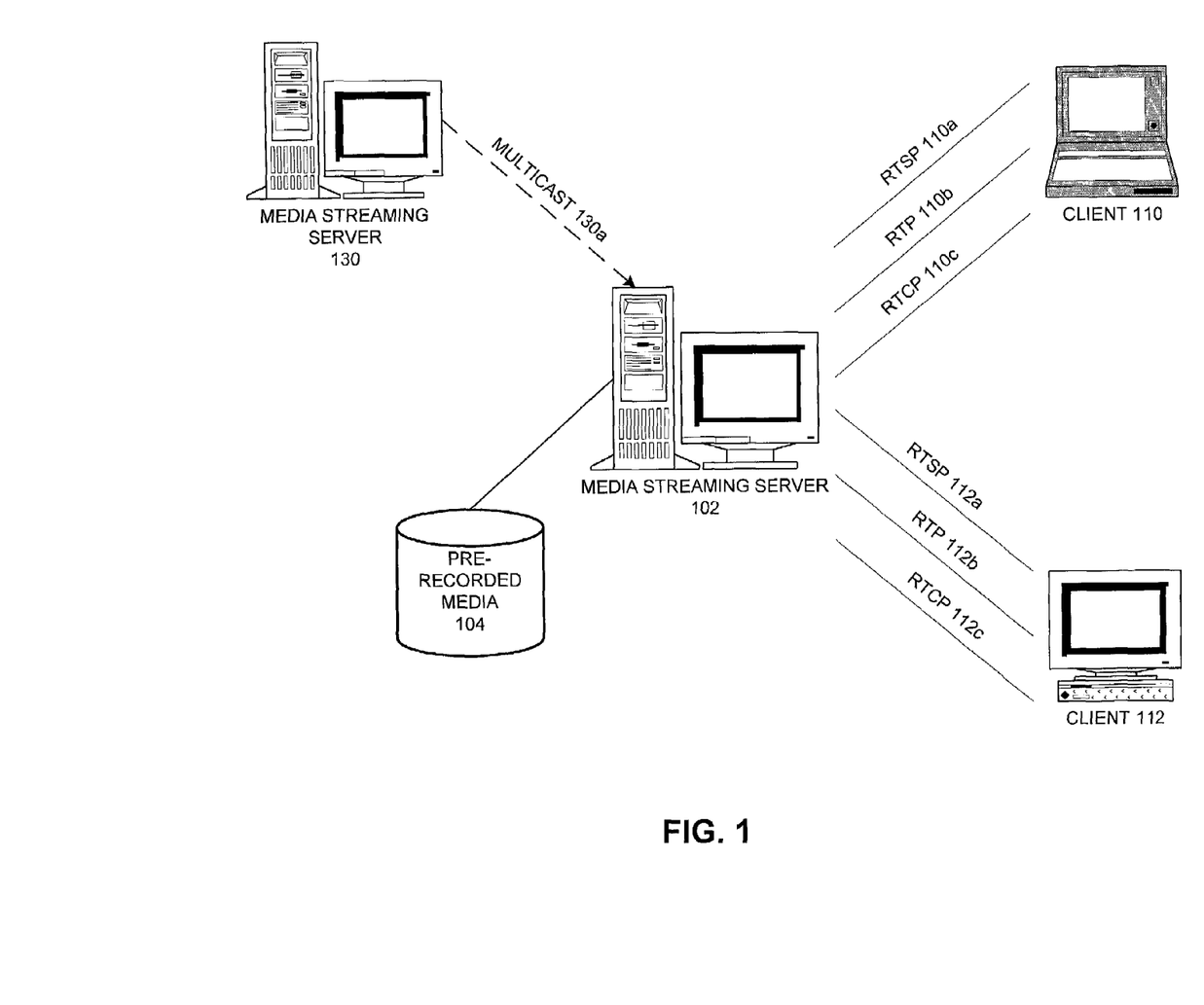
FIG. 1 is a block diagram depicting a server configured to stream media in accordance with an embodiment of the present invention.

FIG. 1 depicts media streaming server 102, configured to stream QuickTime media according to an embodiment of the invention. In FIG. 1, media streaming server 102 serves clients 110, 112. The media that is streamed to the clients may comprise a pre-recorded program retrieved from storage device 104 or a real-time program received from server 130 (e.g., as part of multicast broadcast 130a). Media streaming server 102 may thus stream live events (e.g., concerts, news broadcasts, sporting events), movies, documentaries, training videos, educational programs or classes, etc.

Media streaming may require multiple connections between media streaming server 102 and a client. In the embodiment illustrated in FIG. 1, a first connection is made for RTSP (e.g., connection 110a, connection 112a) to allow a client to control a media stream. In particular, a client uses an RTSP connection to send commands to the media streaming server. The media stream commands that a client may submit to the server in this embodiment include commands such as Options, to receive a list of supported commands; Describe, to prompt the server to describe a media program; Setup, to identify desired tracks it would like to receive (wherein each track may be a different media form, such as video, audio, etc.); Play, to play a media track or program; Pause, to temporarily stop streaming; Teardown, to end a stream; etc. Thus, client 110 may, for example, establish RTSP connection 110a with server 102 and issue the Describe command to receive a description of the content and tracks available for streaming. Client 110 may then submit a Setup request for one or more tracks.

When a client issues a Setup command to the server, the server establishes an RTP connection (e.g., connection 110b, connection 112b) and an RTCP connection (e.g., connection 110c, connection 112c) for the selected track(s). When the Play command is received, the server starts streaming media packets to the client through the RTP connection. And, the server and client may exchange RTCP packets, through the RTCP connection, that describe the quality of the stream. When a Teardown command is issued, the server closes its related stream connections with the issuing client.

The various connections employed by the media streaming server may utilize TCP (Transport Control Protocol) sockets for a compatible communication medium through which the server and a client communicate (e.g., the Internet). In other embodiments of the invention, the sockets may be configured according to a different protocol (e.g., HTTP—HyperText Transport Protocol, FTP—File Transfer Protocol).

As already described, media streaming server 102 of FIG. 1 may stream real-time or live media to clients and may also stream pre-recorded media. Further, in the reflection mode of operation, the media streaming server may redirect to clients media that it receives from another entity, such as a live event, a video camera, a broadcast from another server (e.g., server 130), etc. In this situation media streaming server 102 acts as a client and receives media packets via an RTP connection established with the entity.

Clients 110, 112 are equipped with suitable media players for playing the media streamed from media streaming server 102. For QuickTime media streaming, the clients may operate a QuickTime player such as that available from Apple Computer, Inc. Client computing devices may operate virtually any operating system for which a suitable media player is available (e.g., Solaris, Mac OS, Windows, Linux). Because client devices may have relatively low-bandwidth communication capability (e.g., 56K modem), media streams may be sent with relatively low bit-rates. Higher bit-rates may, of course, be implemented for clients having higher bandwidth capabilities. Clients may identify media to be streamed to them by submitting a URL (Uniform Resource Locator), file name, program name (e.g., name of a movie, song title), etc.

Handling Events Received at a Media Streaming Server

In one embodiment of the invention, a media streaming server such as server 102 of FIG. 1 is configured to stream media to multiple clients and perform various tasks as required for events or data received at the server. An event may comprise a client connection request, a media streaming command, information regarding the quality of a stream, or some other contact from a client, or may comprise data or other signals received from an upstream media server or other source. Various tasks may be initiated in response to the receipt of an event or data.

In this embodiment the events and data are received at server sockets configured according to suitable communication protocols. Efficient, scalable and flexible methods are implemented for detecting and receiving events, determining the task(s) to be accomplished for a given event, and performing them. In particular, system resources (e.g., processor time) are allocated in a manner intended to reduce overhead (e.g., context switches) and contention, but without withholding the resources necessary to meet the demands of a media stream. In particular, by providing greater control over the allocation of processor cycles (and/or other resources), the media streaming server may be able to handle a greater number of clients without significantly degrading either the media streaming or other server services.

In one implementation of this embodiment, events received at a server socket are processed based on the type of event, and/or the client or other entity that initiated the event, rather than the identity of the socket. As a result, one socket may be used for multiple client connections and/or more than one type of event. This helps reduce the overall number of sockets required to stream media for clients.

More specifically, when streaming QuickTime media, the media server creates separate sockets for each RTSP control connection with a client. However, multiple RTP connections may be established, with multiple clients, through one server socket. Similarly, one socket may be used for multiple RTCP connections. However, each individual client may only participate in one RTP or RTCP connection through a given server socket, in order to ensure that each connection through a shared socket has a unique pair of client and server addresses (e.g., a tuple). In particular, the server address may be the same, but the client address will differ for each connection through the socket.

Figure 2:
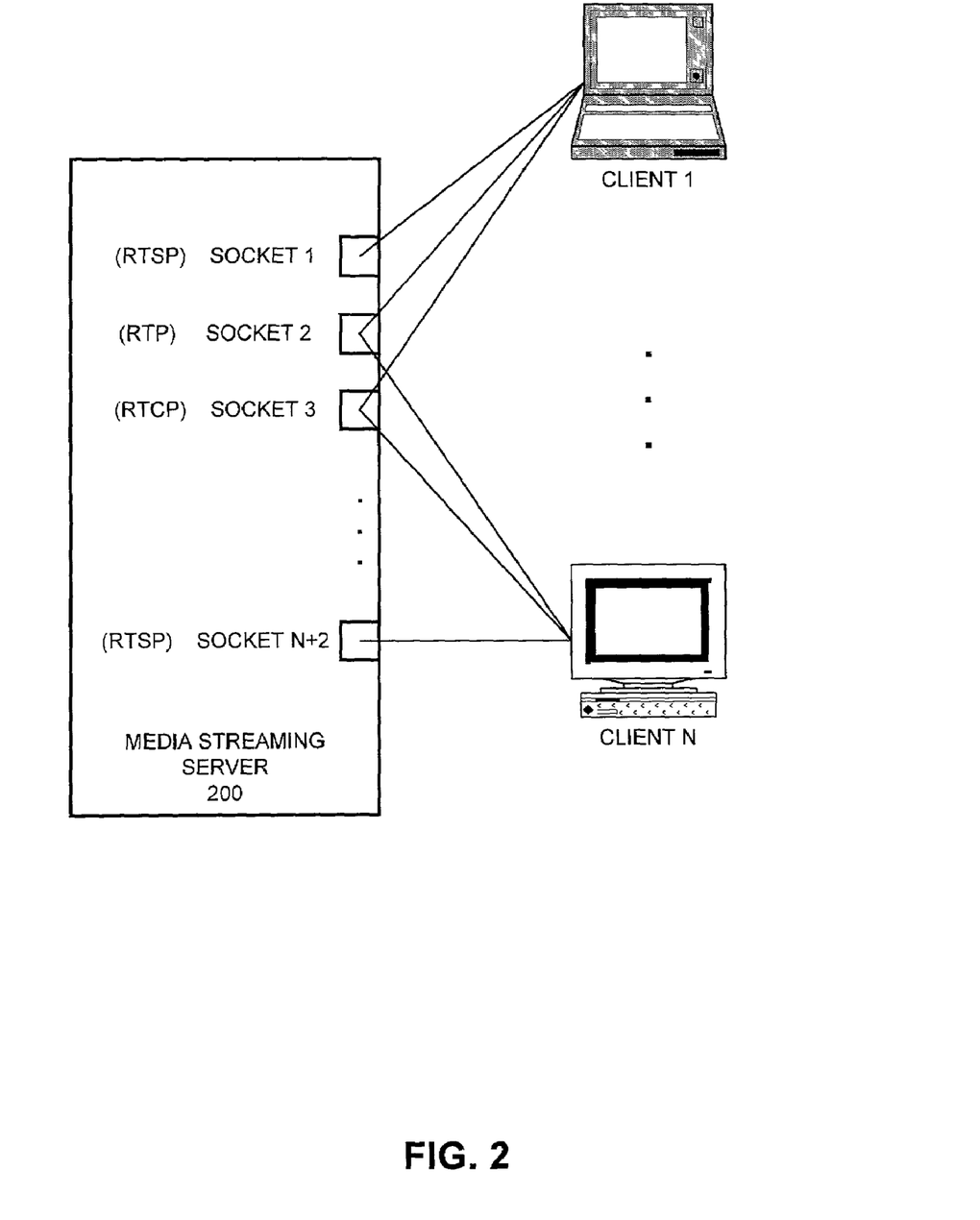
FIG. 2 is a block diagram illustrating one configuration of a media streaming server configured to share a communication socket among multiple client connections, in accordance with an embodiment of the invention.

FIG. 2 illustrates a media server configured to serve multiple clients with shared sockets. Media streaming server 200 includes multiple sockets for serving clients 1-N. In the illustrated embodiment, sockets 1 and N+2 are dedicated to RTSP connections with clients 1 and N, respectively. However, socket 2 is used for both clients' RTP connections, while socket 3 is used for both clients' RTCP connections.

One embodiment of the invention is now described as it may be implemented in a UNIX-based computer system, such as a system that executes the Solaris™ operating system by Sun Microsystems, Inc. In this embodiment, several object-oriented program modules are employed, and are allocated processing threads as described below. In other embodiments of the invention, different types of computer systems may be employed, using other methods of programming and allocating processor resources.

In this embodiment, a Poller comprises a program module or object configured to poll sockets, pipes and other pollable file descriptors. Pollable file descriptors that are being used for client connections, connections to other servers or other entities that are of interest are grouped into one or more PollTables. Each PollTable contains a configurable number of entries (e.g., 256), and a given file descriptor may be registered with any PollTable having an open entry, and new PollTables may be created as needed. One or more processor threads may be dedicated to each PollTable for detecting and responding to events received at its registered file descriptors.

When an event (e.g., client connection, streaming command, data) is received at a socket registered with a Poll-Table, the PollTable passes the event to a PollEventConsumer object that, at a minimum, implements a required method illustratively named CreateTask( ). The PollEventConsumer object is derived from an abstract PollEventConsumer interface class, which may comprise just the CreateTask( ) method. Thus, many different PollEventConsumer objects may be generated for handling specific types of events.

Thus, a Listener class of objects may represent one subclass of the PollEventConsumer class, and may be configured to detect or listen for new connection requests. A Connection class of objects may represent another subclass of the PollEventConsumer class, for handling connections that have been established with clients or other entities (e.g., to execute or process media streaming or other commands). Various other subclasses may also be implemented and, multiple types of specific objects may be derived from the various subclasses.

For example, an RTSPConnection object may be one PollEventConsumer object, derived from the Connection subclass, and may be specifically configured to handle media streaming commands received at an RTSP socket. Other specific PollEventConsumer objects may include an RTCPConnection object (for handling RTCP events), an RTSPListener object for listening for new RTSP connection requests, etc. In summary, various PollEventConsumer objects may be implemented to handle a variety of events.

A particular PollEventConsumer object indicates its interest in a socket or other file descriptor—so that it is notified if an event is received at the socket, by registering itself and the file descriptor with the Poller. One object may register as the consumer of multiple sockets.

Another family of program objects or modules, termed Task objects, may be implemented to accomplish specific tasks associated with the handling of an event. When a PollEventConsumer object is notified of an event, it may create or call a Task object configured to perform a necessary task. Thus, in the case of a client command received through an RTSP connection (e.g., as part of a streaming session), an RTSPConnection object may invoke an RTSPTask object that is configured to execute the client's command (e.g., Describe, Play, Pause).

As another example, for media or other data received at the media streaming server through an RTP socket from another media server (e.g., during reflection), a PollTable may alert a responsible RTPReceiver object (derived from a Receiver subclass of the PollEventConsumer interface). The RTPReceiver object may then invoke a ReceiveData task object to actually read or process the data.

In this embodiment, the thread(s) allocated to a particular PollTable may be exclusively dedicated to that PollTable. Thus, a PollTable thread may simply serve to detect events and pass them off to their respective consumers. In this way, events can be detected quickly without having to dedicate one thread to each socket and thereby incurring excessive contention (e.g., as numerous threads are serviced) or otherwise using processor time inefficiently. For performing the various tasks necessitated by events received at the registered file descriptors, a pool or set of threads may be allocated. In particular, a task queue may be implemented to execute the various task objects invoked by the socket consumers, and may execute them with threads allocated to a thread pool.

Also, in this embodiment of the invention a pipe may be registered with a PollTable and be polled along with sockets and other types of file descriptors. A pipe may be used for communication between the Poller and other program objects. For example, the pipe may be used by a PollEventConsumer object to notify the Poller of a new file descriptor (e.g., socket) to be registered, to request polling be resumed for a particular file descriptor, to request the Poller to unregister a socket (e.g., when a media stream is torn down), etc. Illustratively, when an event is received at a socket, polling is suspended on that socket until the event is handled and the Poller is instructed to resume polling it.

Figure 3:
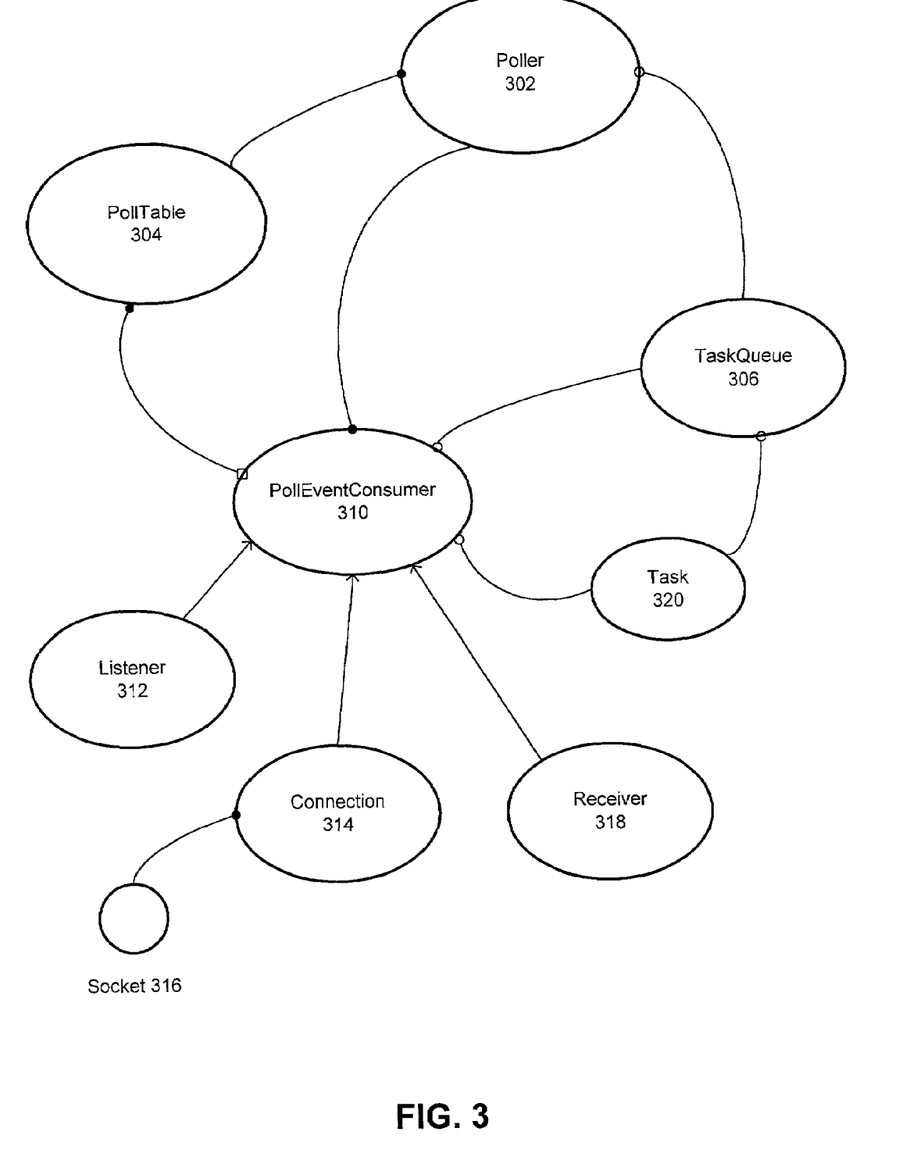
FIG. 3 and FIG. 5 depicts one configuration of program objects cooperating to handle events related to media streaming, in accordance with an embodiment of the present invention.

FIG. 3 depicts the relationship between various classes of program objects for handling events within a media streaming server according to one embodiment of the invention. In the illustrated embodiment, Poller 302 represents a singleton class configured to create and manage PollTables, and to control polling of media server sockets (and other registered file descriptors) within the PollTables. In this embodiment, a file descriptor is registered with Poller 302 and placed in a PollTable when a PollEventConsumer object needs to be notified of events or data received through the descriptor.

PollTable 304 represents a collection of pollable file descriptors that have been registered with the Poller. The PollTable maintains a table, or other structure, and inserts and deletes entries as directed by Poller 302. Each entry identifies a particular file descriptor and the PollEventConsumer object to be notified of an event received at the descriptor. The number of file descriptors that may be placed in a PollTable is configurable, and multiple PollTables may be implemented. The file descriptors may include pipes, sockets and virtually any other pollable entities. Illustratively, a single processor thread or allocation of processor time is shared among a single PollTable's file descriptors, to poll them for events.

PollEventConsumer 310 represents an abstract base class that provides an interface for an object requiring polling services or needing some action to be taken in response to events received at the server. Various subclasses may be created from the PollEventConsumer class and, illustratively, must implement a CreateTask( ) method. FIG. 3 demonstrates three PollEventConsumer subclasses: Listeners, Connections and Receivers.

Listener 312 represents a listener (e.g., a listener socket) configured to listen for events at a server port (e.g., requests for new control connections). Various types of Listener objects may be instantiated for different protocols (e.g., RTSP, FTP, HTTP, Telnet), and multiple instances of one type of Listener may be generated. Illustratively, each type of Listener object is configured to create a control connection of a different type.

Connection 314 represents a connection established with an external entity (e.g., a client, another media server) through a server socket. Illustratively, a new Connection object may be generated when a Listener object detects a TCP connection. Connection 314 comprises a socket (e.g., socket 316, which represents an object-oriented encapsulation of a socket) through which the Connection object will receive control commands (e.g., to establish or manipulate a media stream) or other events. Various types of connections (e.g., RTSP, RTP, RTCP, HTTP) may be embodied in different Connection objects and multiple instances of a single type may be created.

Receiver 318 represents a data or information receiver configured to process data or information received at the server through a given socket. For example, in the illustrated embodiment of the invention, an RTSPListener implementation of Listener 312 may receive a new RTSP control connection from a client wishing to establish a new media stream. The RTSPListener object generates a new RTSPConnection object (e.g., from an RTSPConnection subclass of Connection 314) for a new socket. When the RTSPConnection object receives a command to Play a selected media track, the server begins transmitting RTP packets to the client and an RTCPReceiver object may be instantiated (e.g., from an RTCPReceiver subclass of Receiver 318) to collect stream quality data from the client.

As described above, one RTCP socket may be shared among multiple RTCP connections between the server and multiple clients. In this case, then, only one RTCPReceiver object may be required and, when it receives an event, it will determine which RTCP connection or client initiated the event (e.g., by a network address of the client).

In a reflection mode of operation, in which the media server receives media from another server for forwarding to one or more clients, the media server may implement an RTPReceiver (e.g., as another subclass of Receiver 318) to receive the RTP media packets.

TaskQueue 306 represents a queue for processing or executing tasks related to events received at the file descriptors registered with Poller 302. Illustratively, it operates as a First-In First-Out (FIFO) queue to execute tasks invoked by the various PollEventConsumer objects.

Task 320 represents an abstract class that may be implemented by another object (e.g., the Poller, a PollEventConsumer object). Tasks are placed on TaskQueue 306 and executed by processor threads when taken from the queue. For example, the various actions required to establish, control and monitor a media stream may be handed off as Task objects by the responsible PollEventConsumer objects. Illustratively, a pool of processor threads is allocated to the execution of Tasks placed in the TaskQueue.

In the illustrated embodiment of the invention, an event or data received at the media server through a file descriptor registered with the Poller is detected when a thread associated with the corresponding PollTable polls the PollTable entries. The PollTable entry for the file descriptor is examined to identify the responsible PollEventConsumer object and the event is passed to that object. The PollEventConsumer object then implements the CreateTask( ) method to create a task to handle the event or process the data. Illustratively, the PollTable thread that detected the event may simply hand off the event to the PollEventConsumer object so that the thread is quickly available to handle more activity, in which case a different thread will execute the CreateTask( ) method.

Alternatively, however, if only minor processing is required for an event, execution of the CreateTask( ) method may not actually result in the creation of a task. Instead, the processor thread that executed the CreateTask( ) method (e.g., the PollTable's thread) may also handle the event processing.

After an event at a socket is detected and handed off to the appropriate PollEventConsumer object, the Poller ceases polling of the socket until notified that the event has been processed (e.g., by the PollEventConsumer object or a Task object invoked by a PollEventConsumer object).

Illustratively, when a new socket is to be registered for polling (e.g., when a new client session or stream is to be set up), the PollEventConsumer object that will be responsible for the socket notifies the Poller through a pipe, which may be registered in a PollTable as another file descriptor. The Poller may act similar to a PollEventConsumer object, with regard to the pipe, in that the Poller is notified when there is activity through the pipe. A single pipe or multiple pipes (e.g., one in each PollTable) may be maintained.

Figure 4A:
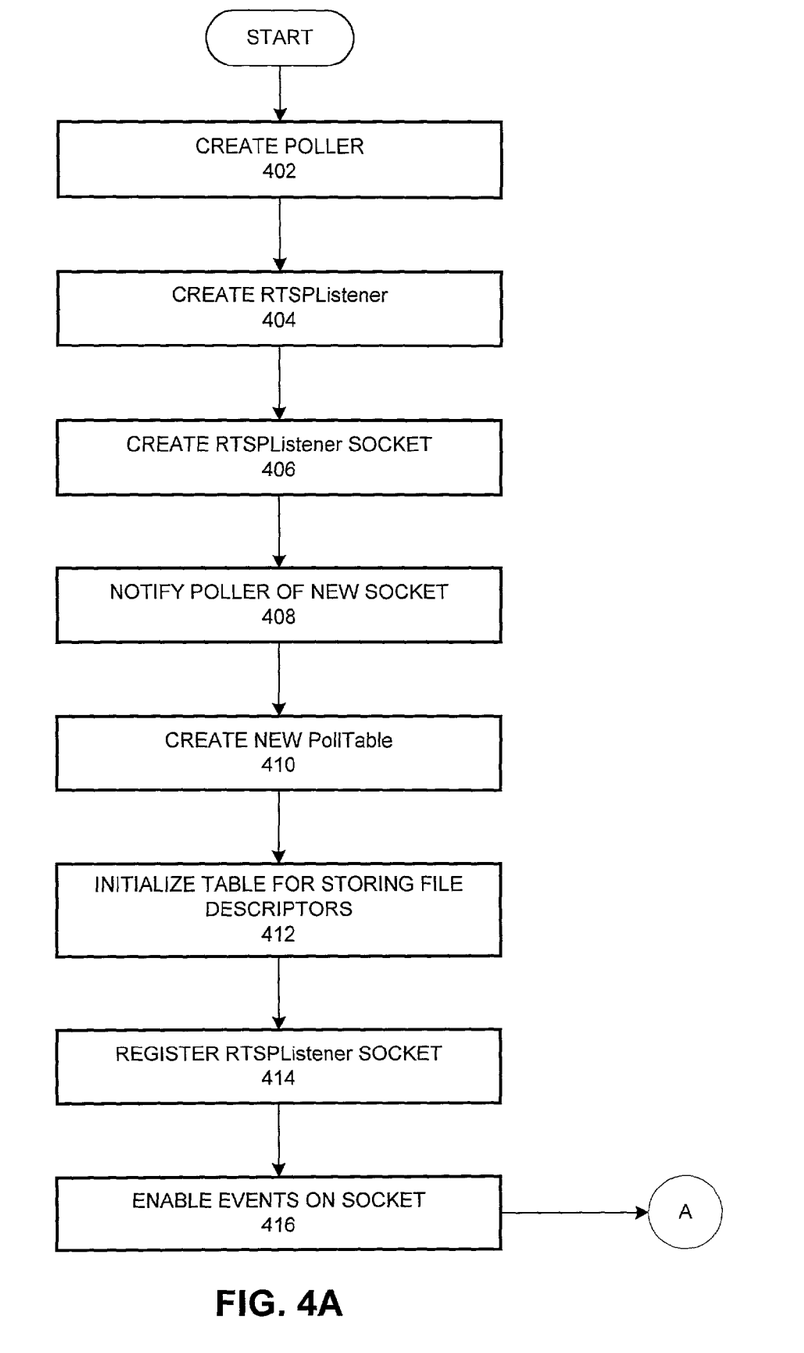
FIGS. 4A–4B comprise a flowchart demonstrating one method of handling media streaming events in accordance with an embodiment of the present invention.
Figure 4B:
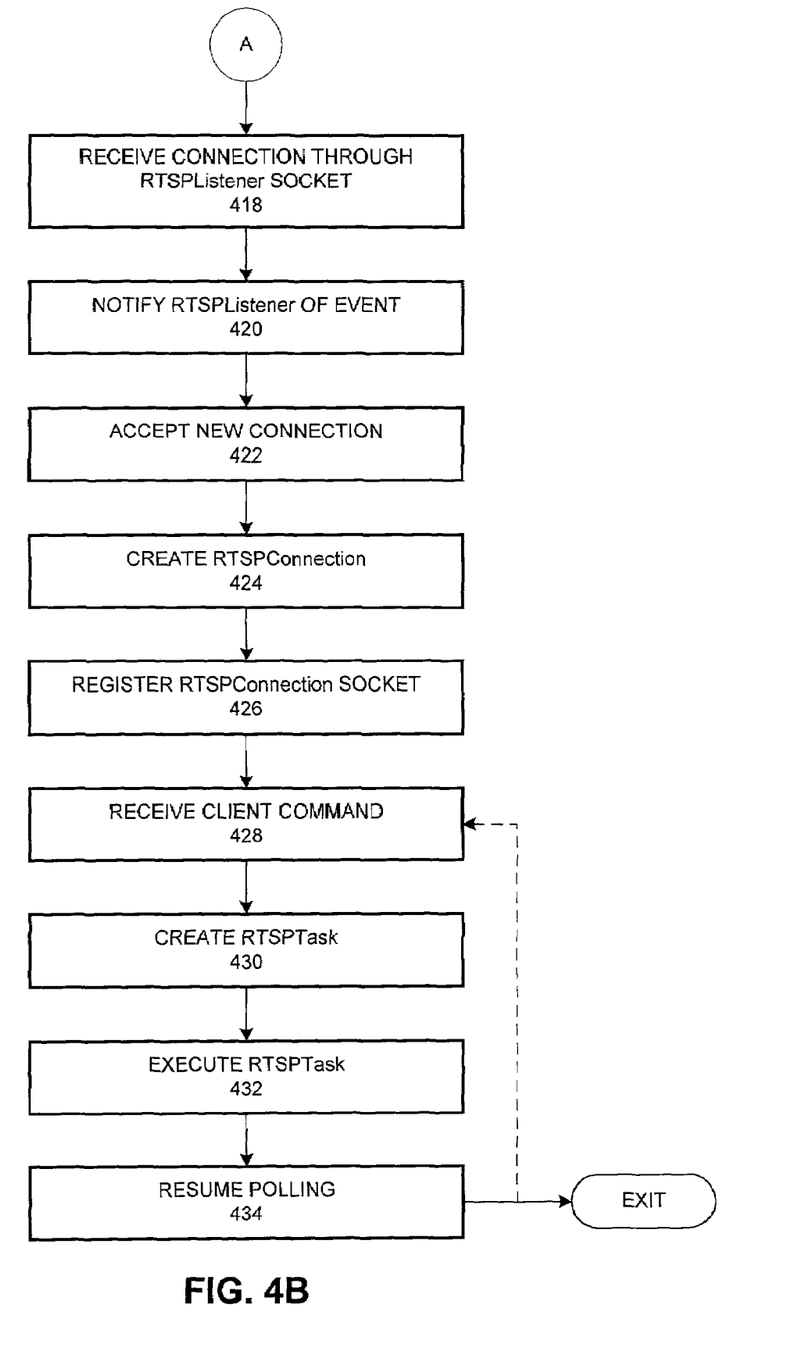
Figure 5:
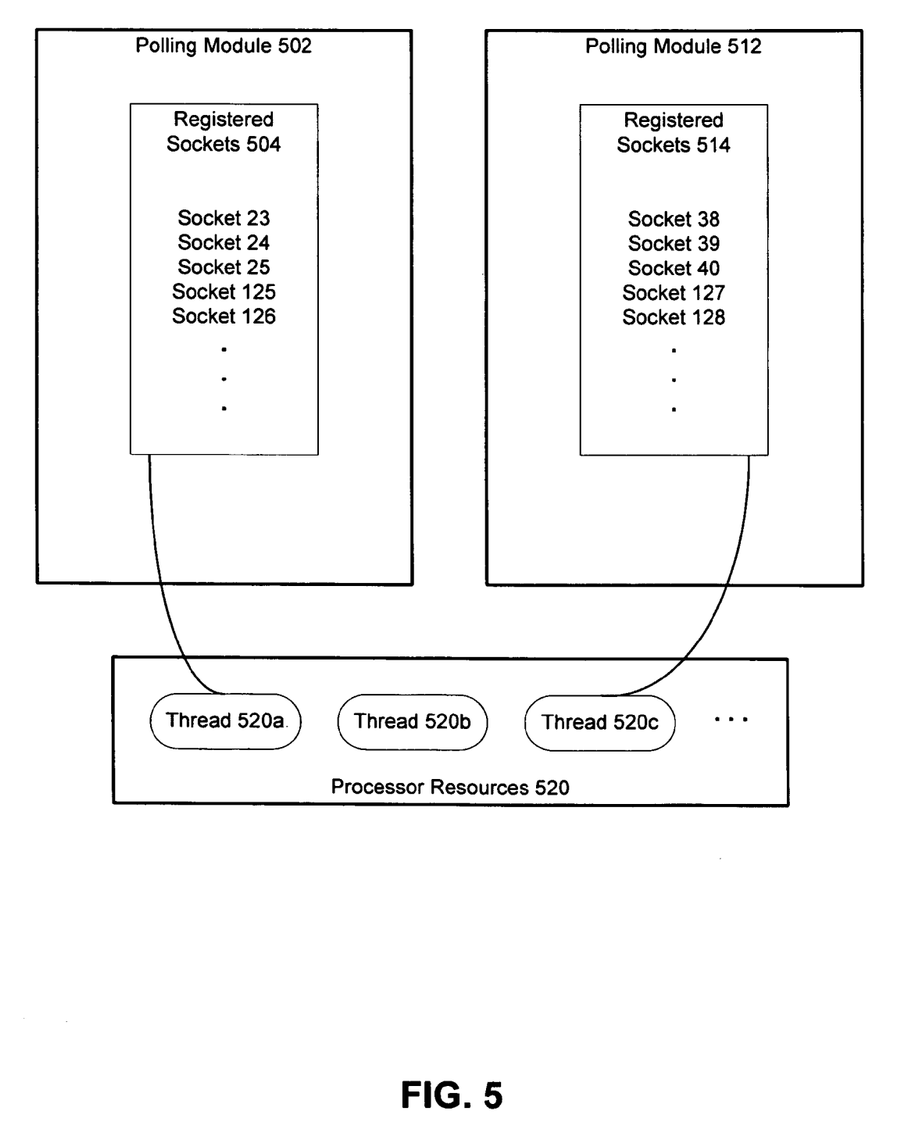

FIGS. 4A–4B depict an illustrative method of implementing an embodiment of the invention to handle events (e.g., client requests, data) received at a server through multiple sockets. The illustrated method demonstrates the creation of the necessary program objects, similar to those depicted in FIG. 3, as the server is initialized, and their utilization as events are received. The server may be a media streaming server configured to stream QuickTime media, in which case it will be configured with the appropriate protocols (i.e., RTSP, RTP, RTCP, SDP).

In state 402 of FIG. 4A, a Poller is created (e.g., as part of the initialization of the server). At this time the Poller maintains only an empty list of PollTables, and no PollEventConsumer objects have been created. The Poller may, however, be provided with a pipe for communicating with other processes or objects. In one alternative embodiment of the invention, a first PollTable may be automatically generated when the Poller is created.

In state 404 a first PollEventConsumer object is instantiated, from an appropriate PollEventConsumer class or subclass, to listen for new client connections. In a server configured to serve clients (e.g., media streaming, web services), the first listener object may be configured for a particular protocol the clients use to establish connections with the server (e.g., RTSP, HTTP, FTP). More specifically, a Listener class may be derived from the abstract base PollEventConsumer class to allow for various types of listener sockets. The Listener class inherits from the PollEventConsumer class, including the CreateTask( ) method, and may add functionality needed for one or more specific types of listeners.

From the Listener class an RTSPListener class and object may be derived to listen for RTSP connections, an HTTPListener class and object may be derived to listen for HTTP connections, etc. RTSPListener and HTTPListener objects are thus just two of the many possible PollEventConsumer and Listener objects. Besides the CreateTask( ) method, an RTSPListener or other specific PollEventConsumer object may also implement other methods—particularly, to establish new control connections in response to client requests.

Other subclasses, serving other purposes, may also be derived from the PollEventConsumer class, as described below, and other types of Listener classes may be derived for different protocols or types of control connections.

In state 406, the new RTSPListener object creates a listener socket to listen for new RTSP control connections. The socket may be created in accordance with the appropriate communication protocol and may be configurable or pre-determined.

In state 408 the RTSPListener notifies the Poller (e.g., through a pipe) of the newly created socket. This initiates registration of the socket, which, when completed, will allow the Poller to poll the socket for events (e.g., new control connection requests).

In state 410, the Poller creates a new PollTable because it has no PollTables that have room to register the new listener socket. The Poller may store a reference to the new PollTable in a list or other structure for identifying actine PollTables.

In this embodiment of the invention, a PollTable comprises a table or other structure for recording a registered file descriptor (e.g., socket, pipe, door) and identifying the PollEventConsumer object(s) that is/are to be notified when an event is received. Illustratively, one or more processor threads are dedicated to each PollTable, and are responsible for polling the PollTable's file descriptors, detecting events and notifying the responsible PollEventConsumer objects. The number of entries in a PollTable may fluctuate as file descriptors are added (e.g., for new client connections) and removed (e.g., because a client connection is terminated). The maximum number of entries may be configurable and, when multiple PollTables are maintained, their populations may be balanced or entries may be segregated so as to allow each PollTable to be operated most efficiently.

In state 412 the new PollTable initializes its table for storing file descriptors. Also, the PollTable automatically enters a pipe for communicating with the Poller and initiates polling of the file descriptors identified in its table.

In state 414, the PollTable detects (e.g., because of an event on the pipe) the need to register the new listener socket. It therefore enters the socket created by the RTSPListener object, with a pointer or reference to the RTSPListener. Illustratively, the new socket is not polled until its responsible PollEventConsumer object (i.e., RTSPListener) requests it to be polled.

The Poller may now notify the RTSPListener object that registration is complete, and identify the PollTable in which the socket has been entered.

In state 416, the RTSPListener contacts the Poller to enable events on the socket, which adds the socket to the polling routine. The server is now prepared to receive client connections and other events.

In state 418 a client connection is received at the RTSPListener socket, which causes a PollTable thread to awaken. The thread examines the PollTable table to identify the PollEventConsumer object that is responsible for the socket—the RTSPListener object.

In state 420, the PollTable object invokes the CreateTask( ) method of the RTSPListener object. The PollTable may identify the event to the RTSPListener object through an event mask or other means of indicating the type of event that has occurred and the file descriptor (socket) on which it occurred. The Poller may now automatically cease polling of the RTSPListener socket until instructed to resume.

In state 422, the CreateTask( ) method executes, possibly as part of a Task object, and accepts the RTSP connection. As part of the acceptance procedure, a new socket is generated for the connection.

In state 424, another type of PollEventConsumer is instantiated—an RTSPConnection object. This object may, for example, be generated from a Connection subclass of the PollEventConsumer class. As with the Listener subclass, the Connection subclass inherits the CreateTask( ) method, but may add functionality. In this case, the Connection subclass represents new control connections established by the server, and the RTSPConnection class and object represent a particular type of control connection. The RTSPConnection object will listen for control commands at the socket generated in state 422.

Illustratively, the handling of the client connection described above (i.e., accept connection, generate socket, create RTSPConnection object) may be a simple procedure, in which case invocation of the CreateTask( ) method need not spawn a new Task object. As described below, however, other events may require more complicated procedures, in which case the use of a Task object and a TaskQueue may be justified.

In state 426, the socket for the new RTSP connection is registered with the Poller and entered in a PollTable, in a similar procedure as described above for the RTSP listener socket. Also, the Poller is instructed to begin polling the RTSPConnection socket.

In state 428, a media command is received at the server through the RTSP connection, at the socket registered by the RTSPConnection object. As described above, a PollTable thread awakens, detects the event and identifies the responsible PollEventConsumer object (i.e., RTSPConnection).

In state 430, the CreateTask( ) method of RTSPConnection is invoked. An RTSPTask object is created and provided with the necessary information (e.g., the type of event and the socket on which it was received) for handling or processing the command.

In state 432, the RTSPTask is placed in a task queue, and eventually retrieved and executed. Illustratively, a task queue may operate as a FIFO queue and have a pool of threads for allocating to the tasks. Task queues may accept various types of tasks, according to the various types of events to be handled. Alternatively, different of task queues may be configured to receive different types of tasks. Depending on the command (e.g., Describe, Play, Pause, Teardown), different actions may be carried out. Illustratively, if additional events (e.g., commands) are received at the RTSPConnection socket before this event is completed, they may be processed by the same RTSPTask object.

When the RTSPTask completes, in state 434 it instructs the Poller to resume polling the RTSPConnection socket.

One skilled in the art will appreciate that the procedure described in conjunction with FIG. 4 is just one method of handling an event received at a media streaming server. Advantageously, the number of processor threads required to implement this method is limited in comparison to traditional methods of handling events and therefore leaves more system resources for non-client events. In particular, rather than creating multiple dedicated sockets for each client media stream, and allocating a thread to each socket, one thread may be responsible for detecting events at multiple sockets. Further, because multiple PollTables may be used, with separate threads allocated to each, each socket will receive adequate attention. Thus, the illustrated method is highly scalable.

The foregoing descriptions of embodiments of the invention have been presented for purposes of illustration and description only. They are not intended to be exhaustive or to limit the invention to the forms disclosed. Many modifications and variations will be apparent to practitioners skilled in the art. Accordingly, the above disclosure is not intended to limit the invention; the scope of the invention is defined by the appended claims.

What is claimed is:

1. A media streaming server configured to stream media to multiple clients, the media streaming server comprising:
   a set of server sockets, including:
   for each of the multiple clients, a separate control socket configured to receive media stream command events from the respective client;
   a single delivery socket configured to stream the media to all the multiple clients simultaneously; and
   a single quality control socket configured to receive media quality information events from all the multiple clients;
   a poller module configured to:
   poll one or more sockets in the set of sockets; and
   when an event is received at the polled socket, pass the event to a consumer object configured to handle the event;
   a set of consumer object classes derived from a single abstract base class of consumer objects, wherein the set of consumer object classes includes:
   a listener object class configured to listen for connection requests from new clients;
   a connection object class configured to handle command events received at polled sockets coupled to the multiple clients; and
   a receiver object class configured to process data received at a polled socket; and
   a set of task objects derived from a single abstract base class of task objects, wherein the set of task objects includes:
   a command task object configured to execute a command received as part of a command event; and
   a receive data task object configured to read data received at the media streaming server.

2. The media streaming server of claim 1, further comprising:
   one or more poll tables configured to identify said control sockets, said delivery socket and said quality control socket for polling.

3. The media streaming server of claim 1, wherein a given consumer object derived from one of said consumer object classes is configured to:
   register a socket with said poller when the consumer object is responsible for handling an event received at the socket.

4. The media streaming server of claim 3, wherein the given consumer object is further configured to:
   place a task object in a task queue to handle an event received at the registered socket.

5. The media streaming server of claim 4, further comprising:
   a first set of processor threads dedicated to executing task objects placed in the task queue.

6. The media streaming server of claim 5, further comprising:
   a second set of processor threads dedicated to polling sockets registered with said poller.

7. The media streaming server of claim 1, wherein the media streaming server:
   uses RTSP (Real-Time Streaming Protocol) to receive media stream command events via the control sockets;
   uses RTP (Real-time Transfer Protocol) to stream the media via the delivery socket; and
   uses RTCP (Real-time Transport Control Protocol) to receive media quality information events via the quality control socket.

8. A method of handling an event received at a media server from one of multiple clients receiving streamed media from the media server, the method comprising:
   (a) polling server sockets of the media server identified in one or more polltables, wherein one or more processor threads are dedicated to each said polltable for polling sockets identified in the polltable;
   (b) executing a first listener object configured to listen at a listener socket for connections from the clients;
   (c) adding the listener socket to one of the polltables;
   (d) in response to receipt of a first client connection at the listener socket:
     (1) waking a processor thread dedicated to the polltable that includes the listener socket;
     (2) identifying the first listener object as the object responsible for handling events received at the listener socket; and
     (3) creating a first control socket dedicated to receiving control commands from the first client connection;
   (e) executing a first connection object configured to accept control commands from client connections;
   (f) adding the first control socket to one of the polltables;
   (g) in response to receipt of a control command at the first control socket:
     (1) waking a processor thread dedicated to the polltable that includes the first control socket;
     (2) identifying the first connection object as the object responsible for handling events received at the first control socket;
     (3) creating a first control task object configured to handle the control command; and
     (4) executing the first control task object;
   (h) streaming the media to the multiple clients simultaneously through a single media delivery socket, and
   (i) receiving streaming quality information from the multiple clients at a single quality control socket.

9. The method of claim 8, wherein (b) comprises:
   (1) deriving a listener class of objects from an abstract base class of consumer objects; and
   (2) instantiating said first listener object from said listener class of objects.

10. The method of claim 8, wherein adding a socket to a polltable comprises initiating polling of the socket.

11. The method of claim 8, wherein (d) further comprises:
    (4) ceasing polling of the listener socket until the first control socket is created.

12. The method of claim 8, wherein (g) further comprises:
    (5) ceasing polling of the first control socket until completion of execution of the first control task object.

13. The method of claim 8, wherein (g)(4) comprises:
    placing the first control task object in a task queue, wherein a set of processor threads is dedicated to executing task objects placed in said task queue.

* * * * *